(12) United States Patent
Somasandharam

(10) Patent No.: US 10,004,097 B1
(45) Date of Patent: Jun. 19, 2018

(54) REESTABLISHMENT OF A NETWORK CONNECTION WITH AN END DEVICE NODE METHODS AND APPARATUSES

(71) Applicant: Intel Corporation, Santa Clara, CA (US)

(72) Inventor: Prahbu Somasandharam, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/385,636

(22) Filed: Dec. 20, 2016

(51) Int. Cl.
| | |
|---|---|
| H04B 7/00 | (2006.01) |
| H04W 76/02 | (2009.01) |
| H04W 4/00 | (2018.01) |
| H04W 24/02 | (2009.01) |
| H04W 88/16 | (2009.01) |

(52) U.S. Cl.
CPC ......... *H04W 76/028* (2013.01); *H04W 4/008* (2013.01); *H04W 24/02* (2013.01); *H04W 76/021* (2013.01); *H04W 76/027* (2013.01); *H04W 88/16* (2013.01)

(58) Field of Classification Search
CPC ............. H04W 76/028; H04W 76/027; H04W 76/021; H04W 4/008; H04W 24/02; H04W 88/16
USPC ....................................................... 455/41.2
See application file for complete search history.

(56) References Cited

U.S. PATENT DOCUMENTS

| | | | | |
|---|---|---|---|---|
| 7,769,409 B2 * | 8/2010 | Harris | ................. | A63F 13/12 370/346 |
| 7,949,301 B2 * | 5/2011 | Bells | ................. | H04W 4/00 455/41.2 |
| 8,693,452 B1 * | 4/2014 | Lauff | ................. | H04W 4/005 370/221 |
| 8,867,504 B2 * | 10/2014 | Tugcu | ................. | H04W 92/16 370/338 |
| 2007/0195794 A1 * | 8/2007 | Fujita | ................. | H04L 12/4633 370/395.53 |

(Continued)

FOREIGN PATENT DOCUMENTS

KR  10-2009-004072 A  4/2009

OTHER PUBLICATIONS

Office Action dated Aug. 11, 2016 from U.S. Appl. No. 14/629,751, 13 pages.

(Continued)

*Primary Examiner* — April G Gonzales
(74) *Attorney, Agent, or Firm* — Schwabe, Williamson & Wyatt, P.C.

(57) ABSTRACT

In embodiments, a device may include a persistent storage medium, a wireless transceiver to send and receive data, and a control module coupled with the persistent storage medium and the wireless transceiver. In embodiments, the control module may establish a network connection, via the wireless transceiver, with an end device node in response to an association request received from the end node. The control module may then store an identifier associated with the end device node in the persistent storage medium to enable the network connection to be reestablished with the end device node in the event that the network connection with the end device node is lost. Other embodiments may be described and/or claimed.

25 Claims, 9 Drawing Sheets

(56) References Cited

U.S. PATENT DOCUMENTS

| | | | |
|---|---|---|---|
| 2009/0234916 A1* | 9/2009 | Cosentino | A61B 5/0537 |
| | | | 709/203 |
| 2013/0058354 A1* | 3/2013 | Casado | H04L 12/4633 |
| | | | 370/401 |
| 2015/0105017 A1* | 4/2015 | Holmquist | H04W 4/008 |
| | | | 455/41.2 |
| 2015/0140932 A1* | 5/2015 | Chien | H04L 63/0407 |
| | | | 455/41.2 |
| 2016/0021253 A1 | 1/2016 | Petit-Huguenin | |
| 2016/0080416 A1 | 3/2016 | Purohit | |
| 2016/0174148 A1 | 6/2016 | Seed et al. | |
| 2016/0249400 A1* | 8/2016 | Somasandharam | H04W 76/028 |
| 2016/0338457 A1* | 11/2016 | Gharabegian | A45B 25/165 |
| 2017/0086545 A1* | 3/2017 | Gharabegian | A45B 25/16 |
| 2017/0086546 A1* | 3/2017 | Gharabegian | A45B 25/165 |
| 2017/0105496 A1* | 4/2017 | Gharabegian | A45B 19/04 |
| 2017/0105497 A1* | 4/2017 | Gharabegian | A45B 25/165 |

OTHER PUBLICATIONS

International Search Report and Written Opinion dated Mar. 15, 2017 for International Patent Application No. PCT/US2017/061367, 14 pages.

Z. Shelby, Ed. et al., "Neighbor Discovery Optimization for IPv6 over Low-Power Wireless Personal Area Networks (6LoWPANs)", Internet Engineering Task Force (IETF), pp. 1-55, Nov. 30, 2012.

\* cited by examiner

US 10,004,097 B1

REESTABLISHMENT OF A NETWORK CONNECTION WITH AN END DEVICE NODE METHODS AND APPARATUSES

TECHNICAL FIELD

Embodiments of the present disclosure are related to the field of networking, and in particular, to methods and apparatuses associated with reestablishment of a network connection with an end device node.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In a personal area network (PAN), under the current state of the art, a routing device that is power cycled may need to rediscover an end device node prior to being able to reestablish a network connection with the end device node. This rediscovery of the end device node may consume time and resources.

DETAILED DESCRIPTION OF ILLUSTRATIVE EMBODIMENTS

Methods, computer-readable media, and devices associated with reestablishment of a network connection with an end device node are discussed herein. In embodiments, a device may include a persistent storage medium, a wireless transceiver to send and receive data, and a control module coupled with the persistent storage medium and the wireless transceiver. The control module may receive an association request from the end device node and, in response, may establish a network connection, via the wireless transceiver, with the end device node. The control module may be configured to, once a network connection with the end device node has been established, store an identifier associated with the end device node in the persistent storage medium. The control module may be configured to utilize such an identifier to enable the network connection to be reestablished with the end device node, in the event that the network connection with the end device node is lost or severed, without the need for the end device node to perform the entirety of another association process to reestablish the network connection. (Note: for the purpose of this disclosure, the terms "lost" and "severed" may be considered as synonymous.)

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
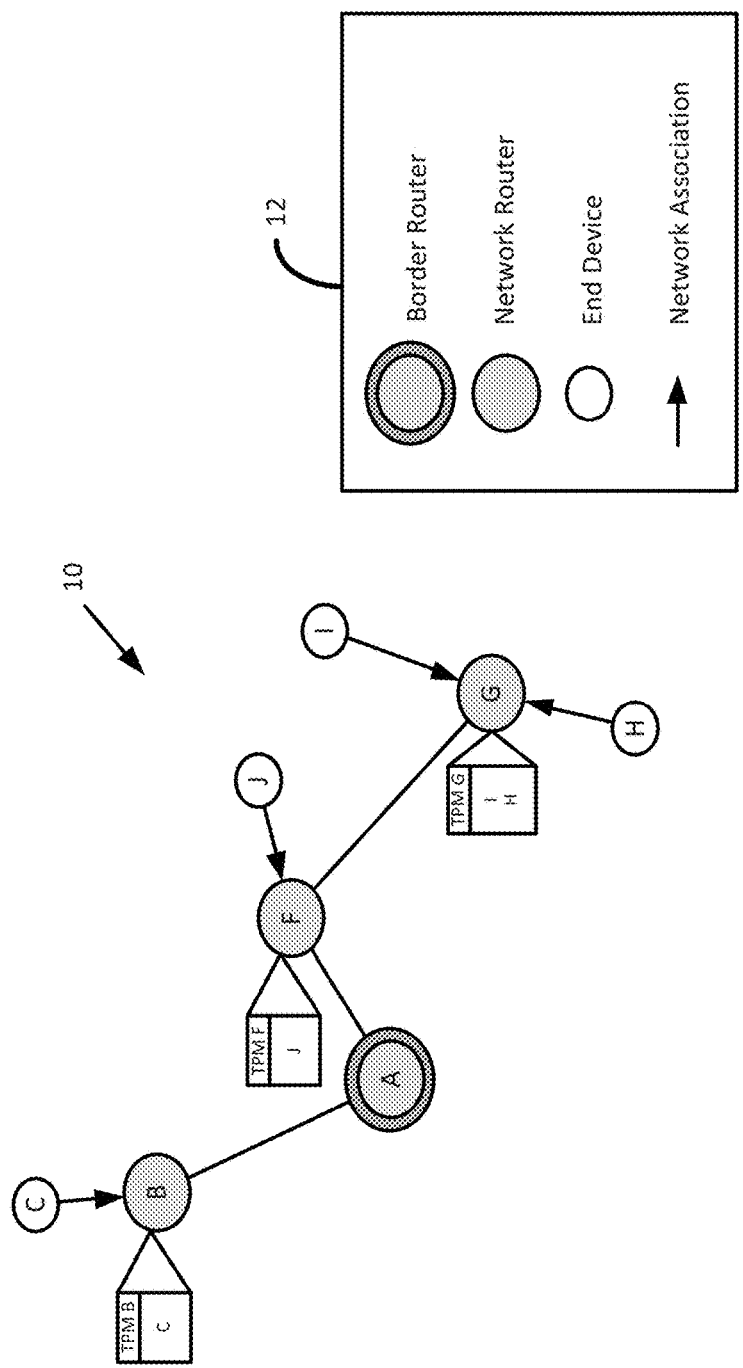
FIG. 1 depicts an illustrative networking environment, in accordance with various embodiments of the present disclosure.

FIG. 1 depicts an illustrative networking environment 10, in accordance with various embodiments of the present disclosure. As depicted, networking environment 10 may include a number of devices, such as network devices, represented here as nodes A, B, C, F, G, H, I, and J. As indicated in box 12, these network devices may take the form of a network router (e.g., nodes B, F, and G), a border router (e.g., node A), or an end device (e.g., nodes C, H, I, and J). As used herein, a network router may refer to a node configured to act as an intermediary device to route data to and from other nodes connected directly or indirectly with the network router. The term border router may refer to a node that is between different portions (e.g., different domains) of a network. Finally, an end device node on the other hand may be a terminal device that may produce or consume data but is not primarily dedicated to routing data or otherwise supporting any other nodes. In some embodiments, the network routers and the border router may take the form of gateway devices. Such a gateway device may be referred to alternatively in the art (e.g., in the context of Institute of Electrical and Electronics Engineers (IEEE) 802.15.4, e.g., IEEE std. 802.15.4 published 2006) as a full-function device (FFD) while an end device may be referred to alternatively in the art as a reduced-function device (RFD). As will be described in more detail below, in embodiments, one or more of nodes A, B, C, F, G, H, I, and J may be configured with the network connection reestablishment technology of the present disclosure, to enable a prior network connection to be reestablished more efficiently, in the event the prior network connection is lost or severed.

In embodiments, an end device node seeking to join the network may be configured to perform an association process, to initiate the joining of the network. The association process may utilize one or both messages of a pair of router solicitation (RS) messages, and may utilize one or both messages of a pair of neighbor advertisement (NA) messages. To better illustrate such an association process, the association process will be described in reference to nodes A-C, however, any of the nodes depicted in networking environment 10, other than nodes C, may have utilized a similar process to initially join networking environment 10.

As an illustrative example, such an association procedure for the IEEE 802.15.4 protocol may be initiated by node C transmitting a message of the pair of RS messages. Specifically the node C may transmit a RS that may include a source link layer address (SLLA) of node C (e.g., a MAC address of node C) to request node B to generate a router advertisement (RA) ad hoc, e.g., instead of at the next scheduled time. The node B may transmit the other message of the pair of RS messages; specifically the node B may transmit a router advertisement (RA), which may include option information such as a prefix information option (PIO), 6LoWPAN context option (6CO), authoritative border router option (ABRO), or source link layer address option (SLLAO). Node C may send a layer two acknowledgement, e.g., a link layer acknowledgment.

Node C may send one of the messages of the pair of NA messages. However, upon receipt of this message node B may communicate with another router (e.g., border router A) to before sending the other message of the pair of NA messages back to node C. Such communication may be to determine whether an identifier of node C is a duplicate with another device in the same domain. Node B may send an L2 acknowledgement back to node C, in the meantime.

After communication with the other router (e.g., the border router A), node B may send the other message of the pair of NA messages back to node C. Node C may send a layer two acknowledgement back to node B.

In embodiments, upon successfully establishing a network connection with node C, node B may be configured to store the identifier associated with node C in a persistent storage medium, depicted here by trusted platform module B (TPM B). In some embodiments this identifier may include either, or both, of the 64-bit extended MAC address or the 16-bit logical address obtained in the association process. As used herein, a persistent storage medium may refer to a storage medium capable of maintaining state in the absence of operational power or during a reset, such as, but not limited to, non-volatile dynamic random access memory (DRAM) like ferroelectric RAM, magnetoresistive RAM, phase change RAM, and so forth. In such embodiments, node B may be further configured to utilize the identifier associated with node C to initiate the reestablishment of the network connection with node B in the event the network connection with node C is severed. Storing the identifier in a persistent storage medium may enable node B to maintain the identifier associated with node C in the event the network connection is severed due to, for example, loss of power or reset of node B.

As an example, if node B were to lose power, the network connection between node B and node C may be severed. In such a scenario, one method of reestablishing the connection would be to have node C repeat the association process described above in order to rejoin the network (e.g., another pair of RS messages and another pair of RA messages). Repeating the association process described above may, however, unnecessarily waste time and resources. By configuring node B to initiate reestablishing the network connection with node C, the association process described above, or at least portions of the association process described above, may be able to be omitted which may reduce the amount of time required to reestablish the network connection with node C, when compared with repeating the association process described above.

As an example, in some embodiments, this reestablishing the network connection with node C may be accomplished utilizing an unsolicited neighbor advertisement. The unsolicited neighbor advertisement is different than the previously described pair of RA messages in that the node B does not receive a neighbor solicitation prior to transmission of the neighbor advertisement. In such embodiments, the identifier of node B may include the address on the network allocated to node B (e.g., the 16-bit logical address discussed above) and the 64-bit extended MAC address of node B, which may be utilized by node B in reestablishing the network connection.

Figure 3:
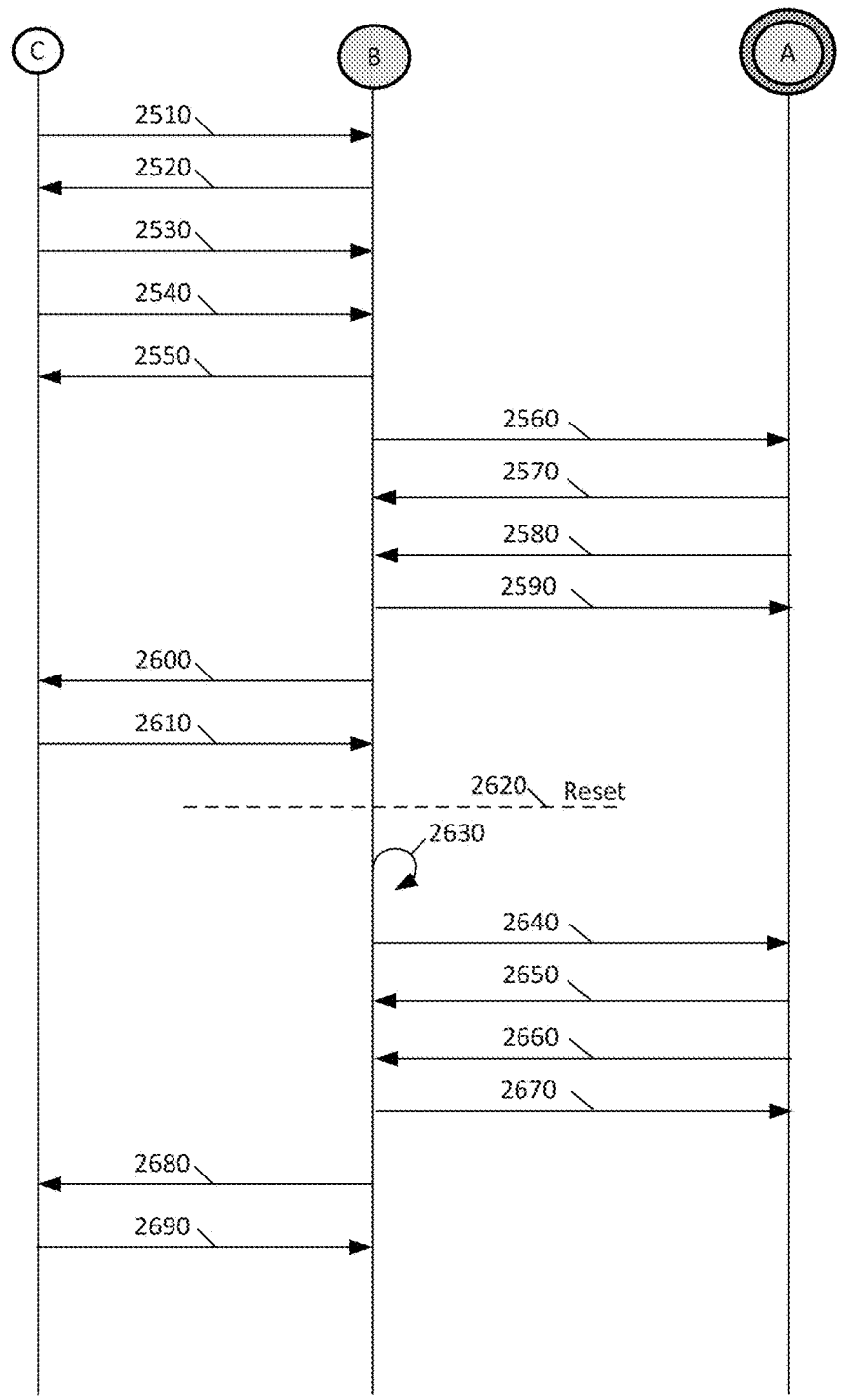
FIG. 3 illustrates an example signaling diagram for reestablishing a network connection, in accordance with various embodiments of the present disclosure.

Returning to an 802.14.4 embodiment, referring now to FIG. 3, a process showing messaging before and after a reset (illustrated by dashed line 2620) is shown. For instance messages 2510, 2520, and 2530 correspond to messages of the RS pair and the layer two acknowledgement, respectively. Messages 2540, 2600, and 2550 correspond to the RA pair and acknowledgement, respectively. Message 2610 is an additional layer two acknowledgement. Messages 2560-2590 correspond to the communication between node B and node C, and are similar to messages 2640-2670 which will be explained below in the discussion of messaging after the reset 2620.

After the reset 2620, node B may retrieve 2630 a stored identifier of node C. Node B may transmit a duplicate address request (DAR) 2640 to determine whether the identifier is already in use by another node. The DAR request 2640 may include a new address registration option (ARO) in some embodiments. Node A may transmit a layer two acknowledgement 2650, and may transmit a duplicate address confirmation (DAC) 2660 if the identifier is not already in use by another node. Node B may transmit a layer two acknowledgement 2670 to node A.

Node B may then transmit a neighbor advertisement message 2680, which may include information of the ARO, such as status information. Node C may transmit a layer two acknowledgement 2690.

By utilizing the identifier of node C in the manner described above, the reestablishment of the network connection with node C may be able to occur in a reduced amount of time, e.g., approximately 2 seconds, or less, in most network conditions. For example, if node B initiates reestablishing the network connection with node C, in some embodiments, a portion of a router association process may be skipped. In such embodiments, however, node B may still perform a router-to-border router sub-process (e.g., a complete sub-process) and/or transmit an unsolicited neighbor advertisement in order to maintain security of the network connection and/or other reasons.

As depicted in FIG. 1, the persistent storage medium may, in some embodiments, be a TPM integrated with node B, e.g., a protected storage area within memory or a hardware processor of node B. In such embodiments, the TPM may prevent manipulation of identifiers stored in the TPM. As a result, utilizing a TPM as the persistent storage medium may enable networking environment 10 to maintain a level of security, in reestablishing severed network connections that may not be attainable if the persistent storage medium were not a TPM. It will be appreciated that this is merely an example embodiment and that other mechanisms for maintaining such security may be utilized in place of the TPM. Furthermore, in some embodiments security may not be an issue. In such embodiments, the persistent storage medium may be any conventional persistent storage medium.

While the discussion above was limited to nodes A-C, each end device node of networking environment 10 is illustrated with a directional network association depicted by an arrow pointing from each end device node to that end device node's respective router node. As such, it will be appreciated that the directionality of the network association does not characterize a direction of data flow and that the data flow between nodes may be bidirectional. Each of these network associations may be formed in the same, or a similar, association process to that described above in reference to nodes A-C. In addition, each router node, may have a persistent storage medium (e.g., TPM B, TPM F, and TPM G) integrated therewith that may be utilized by that router node to store identifiers of the end device nodes of that router node. Each of these router nodes may then be able to utilize the identifiers in that respective router node's persistent storage medium to reestablish a severed connection with any or all of that router node's end device nodes.

It will be appreciated that in some scenarios power may be lost to all, or a subgroup, of the router nodes. In such scenarios, it will be appreciated that each router node may successively utilize the stored identifiers to restore the entire network, or the subgroup of the network, which may save a great deal of time and resources when compared to having to rebuild the network through the association process.

In some embodiments, networking environment 10 may be a wireless personal area network (WPAN). In some embodiments, networking environment 10 may be a sensor network. In some embodiments, networking environment 10 may be part of a collection of internet of things (IoT). In such embodiments, end device nodes C, H, I, and/or J may represent IoT edge devices. It will be appreciated that, while the 802.14.4 protocol has been discussed above for illustrative purposes, the network depicted in networking environment 10 may be established utilizing any appropriate network protocol. Such network protocols may include, but are not limited to, WiFi network protocol, Bluetooth network protocol, ZWave network protocol, Zigbee network protocol, an internet protocol version 6 over low-power WPAN (6LoWPAN), a radio-frequency identification (RFID) network protocol, or a cellular network protocol.

Figure 2:
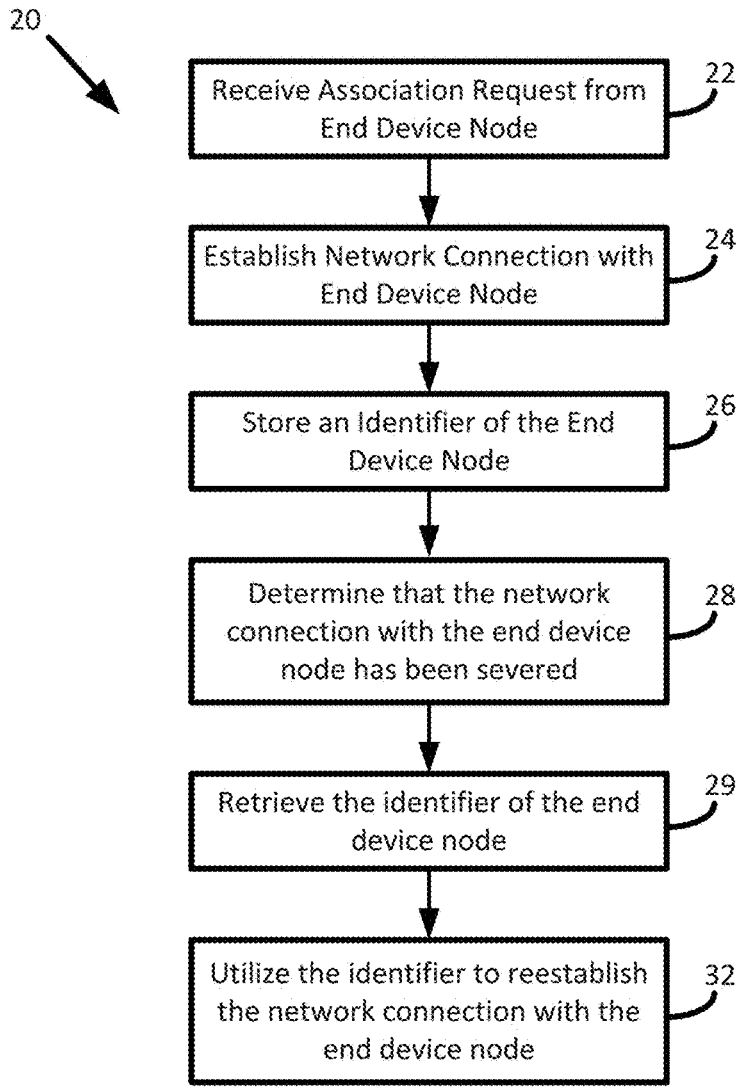
FIG. 2 illustrates an example process flow for reestablishing a network connection, in accordance with various embodiments of the present disclosure.

FIG. 2 illustrates an example process flow 20 for reestablishing a network connection, in accordance with various embodiments of the present disclosure. In embodiments, such a process flow may be carried out, for example, by a network device such as router nodes B, F, or G depicted in FIG. 1 or having a control module and storage (e.g., control module 32 and storage 38 of FIG. 4) integrated therewith.

The process flow may begin at block 22 where the network device may receive an association request from an end device node. Such an association request may correspond with the association request described above in reference to the association process of FIG. 1.

In response to receiving the association request, the network device may accept the association request from the end device node and may establish a network connection at block 24 between the end device node and the network device, which may also be referred to as the router node. Once the network connection with the end device node has been established, the network device may store an identifier of the device node in a persistent storage medium of the network device at block 26. Such an identifier and persistent storage medium may correspond with the identifier and persistent storage medium discussed in reference to either of FIG. 1, 3, or 4. As such, in some embodiments, the persistent storage medium may be a trusted platform module (TPM) such as that depicted and discussed in reference to FIG. 1, 3, or 4.

At block 28, the network device may determine, or detect, that the network connection with the end device node has been severed. Such a determination may, in some embodiments, be made during a reset of the network device, after a power outage of the network device, for example. In such an embodiment, the existence of any identifiers in the persistent storage medium of the network device may be sufficient to indicate to the network device that a network connection with the end device nodes identified by the identifiers has been severed (in such embodiments the network device may be configured to delete a stored node identifier when the corresponding connection is terminated normally). In other embodiments, such a determination may be made by the network device receiving a transmission from any external device to indicate that a network connection with the network device is severed. It will be appreciated that the above examples are merely meant to be illustrative and that any method of determining that a network connection has been severed, or lost, between the network device and any end device nodes of the network device is within the scope of this disclosure.

In response to determining that a network connection with an end device node has been severed, the network device may, at block 29, retrieve the identifier of the end device node, from the persistent storage medium of the network device. As discussed above in reference to FIG. 1, this identifier may include the 16-bit logical address and the 64-bit extended MAC address. The network device may then utilize the identifier of the end device node to initiate reestablishment of the network connection at block 32. Such a reestablishment of the network connection may correspond with the reestablishment of the network connection discussed above in reference to FIG. 1 or 3.

As discussed in reference to FIG. 1, the network device may be a network router, network coordinator, gateway device, or full-function device (FFD). In embodiments, the network connection may be part of a wireless personal area network (WPAN). Such a WPAN may be formed utilizing any appropriate network protocol, including, but not limited to, 802.14.4 network protocol, ZigBee network protocol, WiFi network protocol, Bluetooth network protocol, ZWave network protocol, an internet protocol version 6 over low-power WPAN (6LoWPAN), a radio-frequency identification (RFID) network protocol, or a cellular network protocol.

Figure 4:
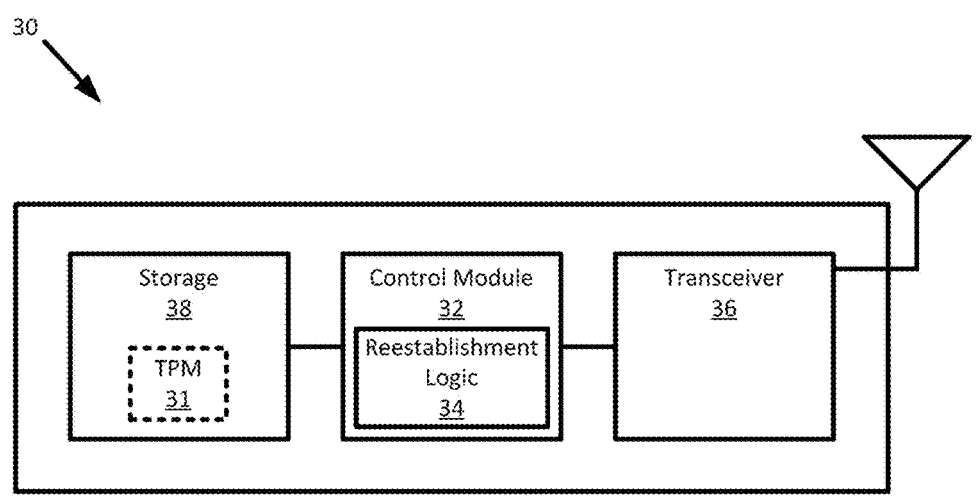
FIG. 4 is a schematic illustration of an example device, in accordance with various embodiments of the present disclosure.
Figure 5:
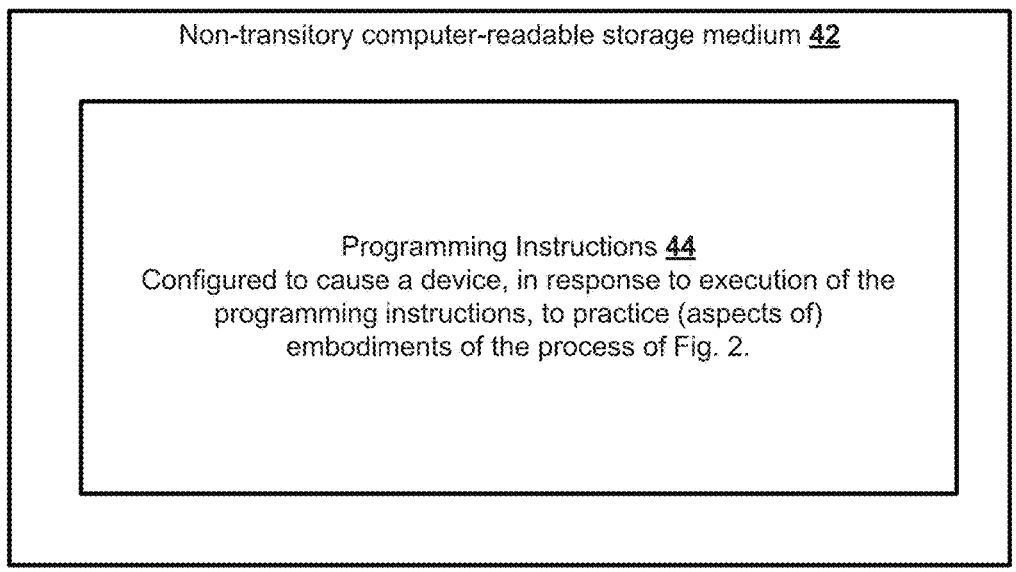
FIG. 5 illustrates an example non-transitory computer-readable storage medium having instructions configured to practice all or selected ones of the operations associated with the processes described above.

Referring now to FIG. 4, wherein an example network device 30 suitable to implement the method described in reference to FIG. 1, 2 or 3, in accordance with various embodiments, is illustrated. As shown, network device 30 may include control module 32 coupled with transceiver 36 and storage 38 by way of one or more buses. In embodiments, control module 32 may include reestablishment logic 34 to enable network device 30 to perform any portions of the method described in reference to FIG. 1, 2, or 3. Reestablishment logic 34 may be implemented as circuitry, software, or any combination thereof. In other embodiments, control module 32 may be a processor and reestablishment logic 34 may be implemented in whole or in part as executable instructions stored in storage 38 to be executed by control module 32 to cause network device 30 to perform any portion of the method described in reference to FIG. 1, 2, or 3. Storage 38 may include a protected area to host TPM 31 for storing identifiers of nodes with whom network device 30 has established connections.

In embodiments, control module 32 may include one or more processors or processor cores, and memory. In embodiments, multiple processor cores may be disposed on a single die. In some embodiments, one or more of these processors may be microcontrollers that may be configured by reestablishment logic 34 to perform any of the above described processes or any portion thereof. For the purpose of this application, including the claims, the terms "processor" and "processor cores" may be considered synonymous, unless the context clearly requires otherwise. Additionally, network device 30 may include a storage 38 (such as that discussed above in reference to FIGS. 1-3), which may, for example, include a trusted platform module (TPM) 31.

Each of these elements may perform its conventional functions known in the art, in addition to any specialized functions described herein. In particular, storage 38 may be employed to store a permanent copy of programming instructions implementing one or more of the operations described earlier, e.g., but not limited to, operations described above in reference to FIGS. 1-3. The various operations may be implemented by assembler instructions supported by control module 32 or high-level languages, such as, for example, C, that may be compiled into such instructions.

The permanent copy of the programming instructions may be placed into storage 38 in the factory, or in the field, through, for example, a distribution medium (not shown), such as a compact disc (CD), or through transceiver 36 (from a distribution server (not shown)). That is, one or more distribution media having an implementation of one or more processes described in reference to FIG. 1, 2, or 3 may be employed to distribute these components to various computing devices.

The number, capability, and/or capacity of these elements 32-31 may vary, depending on the intended use of example network device 30. For instance, in some embodiments network device 30 may be a single device router, and in other embodiments network device 30 may be a multiple device router. In multiple device router embodiments, if the network device 30 itself enters a power loss state (because for instance all of its devices lose power), the network device 30 may perform a reestablishment with one or more nodes using reestablishment logic 34. It should be appreciated that in some examples in the case of a multiple device router the network device 30 itself may not enter a power loss state even a subset of its devices loses power due to redundancy or for other reasons.

FIG. 4 illustrates an example non-transitory computer-readable storage medium having instructions configured to practice all or selected ones of the operations associated with the processes described above. As illustrated, non-transitory computer-readable storage medium 42 may include a number of programming instructions 44. Programming instructions 44 may be configured to enable a device, e.g., network device 30, in response to execution of the programming instructions, to perform one or more operations of the processes described in reference to FIGS. 1-3. In alternate embodiments, programming instructions 44 may be disposed on multiple non-transitory computer-readable storage media 42 instead. In still other embodiments, programming instructions 44 may be encoded in transitory computer-readable medium, such as signals.

Referring back to FIG. 4, for one embodiment, control module 32 may include at least one processor packaged together with memory having reestablishment logic 34 configured to perform one or more operations of the processes described with reference to FIG. 1, 2, or 3. For one embodiment, control module 32 may include at least one processor packaged together with memory having reestablishment logic 34 configured to practice aspects of the methods described in reference to FIGS. 1-3 to form a System in Package (SiP). Such an SiP may be utilized in any suitable network device and may also include transceiver 36 and/or storage 38 integrated therewith. For one embodiment, control module 32 may include at least one processor integrated on the same die with memory having reestablishment logic 34 configured to perform one or more operations of the processes described in reference to FIGS. 1-3. Such embodiments, may also include transceiver 36 and/or storage 38 integrated onto the same die. For one embodiment, control module 32 may include at least one processor packaged together with memory having reestablishment logic 34 configured to perform one or more operations of the process described in reference to FIGS. 1-3 to form a System on Chip (SoC). Such an SoC may be utilized in any suitable network device and may also include transceiver 36 and/or storage 38 integrated therewith.

As mentioned previously, in some embodiments, device 30 (FIG. 3) may operate in a networking environment that may be a part of a collection of internet of things (IoT) (for instance, as previously described with reference to FIG. 1, the nodes C, H, I, and/or J may represent IoT edge devices). The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 6 and 7.

In embodiments in which device 30 (FIG. 3) operates in a networking environment that may be a part of a collection of internet of things (IoT). For instance, a node of the device 30 may be an edge device made up of multiple devices, a fog device (fog devices are explained later with reference to FIG. 9), or the like, or combinations thereof. Also, as mentioned previously, In the event of device 30 experiencing a power loss but node including an edge device made up of multiple devices maintaining power, the edge device and its associated multiple device's secured links may remain intact (e.g., there may be no-establishment messages between the edge device and its devices). The device 30 may utilize reestablishment logic 34 (FIG. 4) to reestablish the link with the edge device, however.

Figure 6:
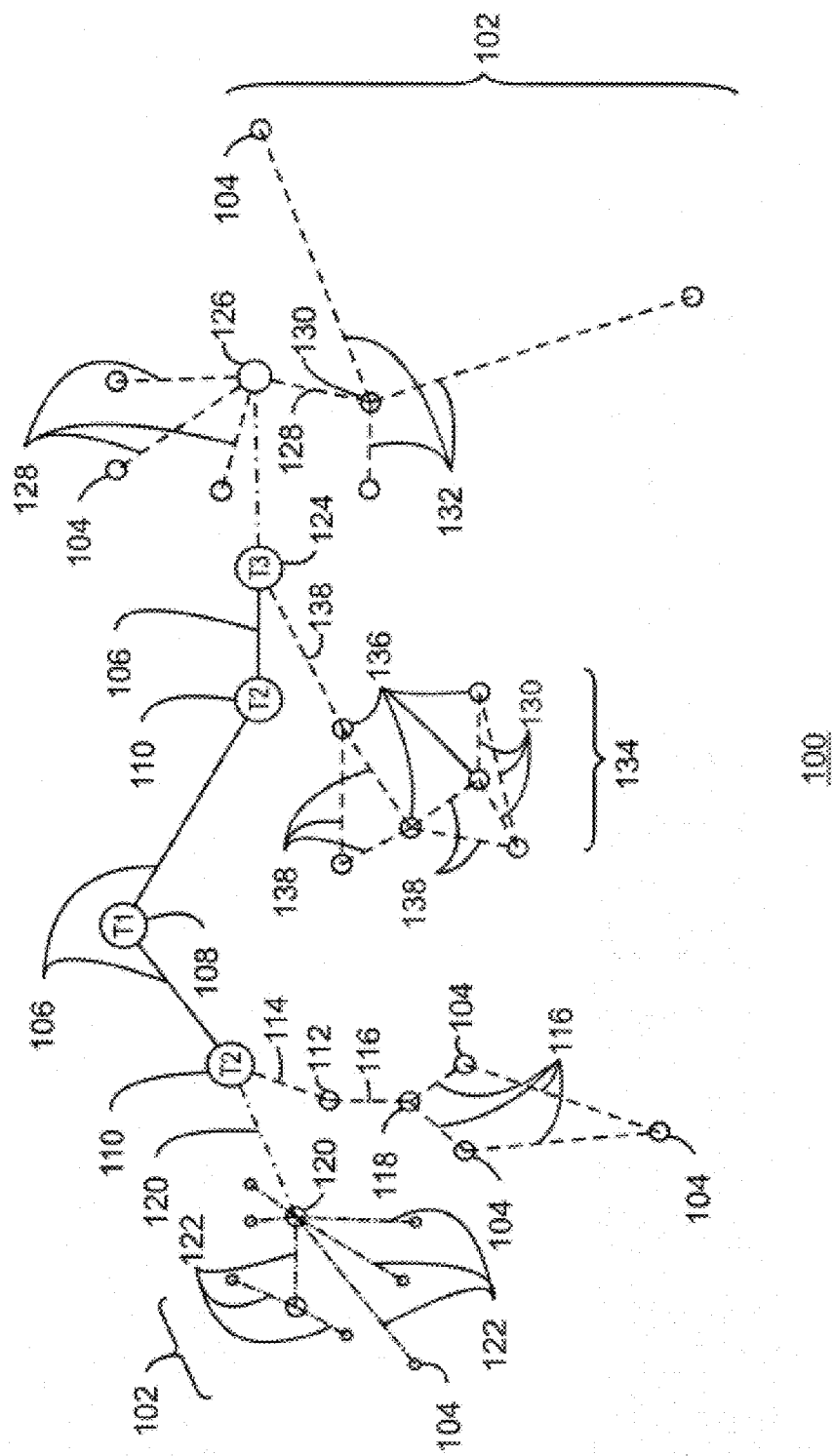
FIG. 6 illustrates interconnections that may be present between the Internet and IoT networks, in accordance with various embodiments of the present disclosure.
Figure 7:
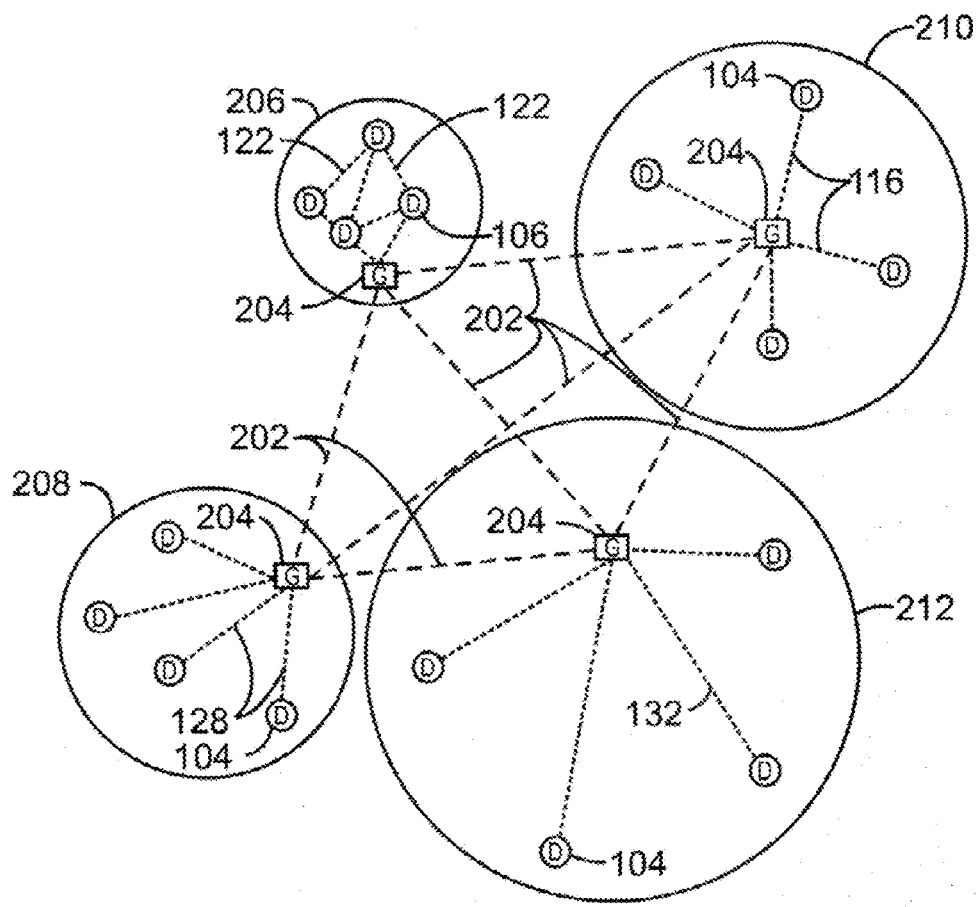
FIG. 7 illustrates a domain topology that may be used for a number of internet-of-things (IoT) networks coupled through backbone links to gateways, in accordance with various embodiments of the present disclosure.

FIG. 6 is a simplified drawing of interconnections that may be present between the Internet 100 and IoT networks. The interconnections may couple smaller networks 102, down to the individual IoT device 104, to the fiber backbone 106 of the Internet 100. To simplify the drawing, not every device 104, or other object, is labeled.

In the simplified drawing, top-level providers, which may be termed tier 1 providers 108, are coupled by the fiber backbone of the Internet to other providers, such as secondary or tier 2 providers 110. In one example, a tier 2 provider 110 may couple to a tower 112 of an LTE cellular network, for example, by further fiber links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 120 may couple a tier 2 provider 110 to a gateway 120. A number of IoT devices 104 may communicate with the gateway 120, and with each other through the gateway 120, for example, over Bluetooth low energy (BLE) links 122.

The fiber backbone 106 may couple lower levels of service providers to the Internet, such as tier 3 providers 124. A tier 3 provider 124 may be considered a general Internet service provider (ISP), for example, purchasing access to the fiber backbone 110 from a tier 2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWan specification promulgated by the LoRa alliance.

The tier 3 provider 124 may also provide access to a mesh network 134 through a coordinator device 136 that communicates with the tier 3 provider 124 using any number of communications links, such as an LTE cellular link, an LPWA link, or a link 138 based on the IEEE 802.15.4 standard, such as Zigbee®. Other coordinator devices 136 may provide a chain of links that forms cluster tree of linked devices.

It may be clear that each of the IoT devices 104 include the appropriate transceiver for the communications with that device. Further, each device 104 may include other transceivers for communications using additional protocols and frequencies.

The technologies and networks may enable the exponential growth of devices and networks. As the technologies grows, the network may be developed for self-management, functional evolution, and collaboration, without needing direct human intervention. Thus, the technologies will enable networks to function without centralized controlled systems. The technologies described herein may automate the network management and operation functions beyond current capabilities.

FIG. 7 is a simplified drawing of a domain topology 200 that may be used for a number of internet-of-things (IoT) networks coupled through backbone links 202 to gateways 204. Like numbered items are as described with respect to FIG. 6. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

The network topology 200 may include any number of types of IoT networks, such as a mesh network 206 using BLE links 122. Other IoT networks that may be present include a WLAN network 208, a cellular network 210, and an LPWA network 212. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 8:
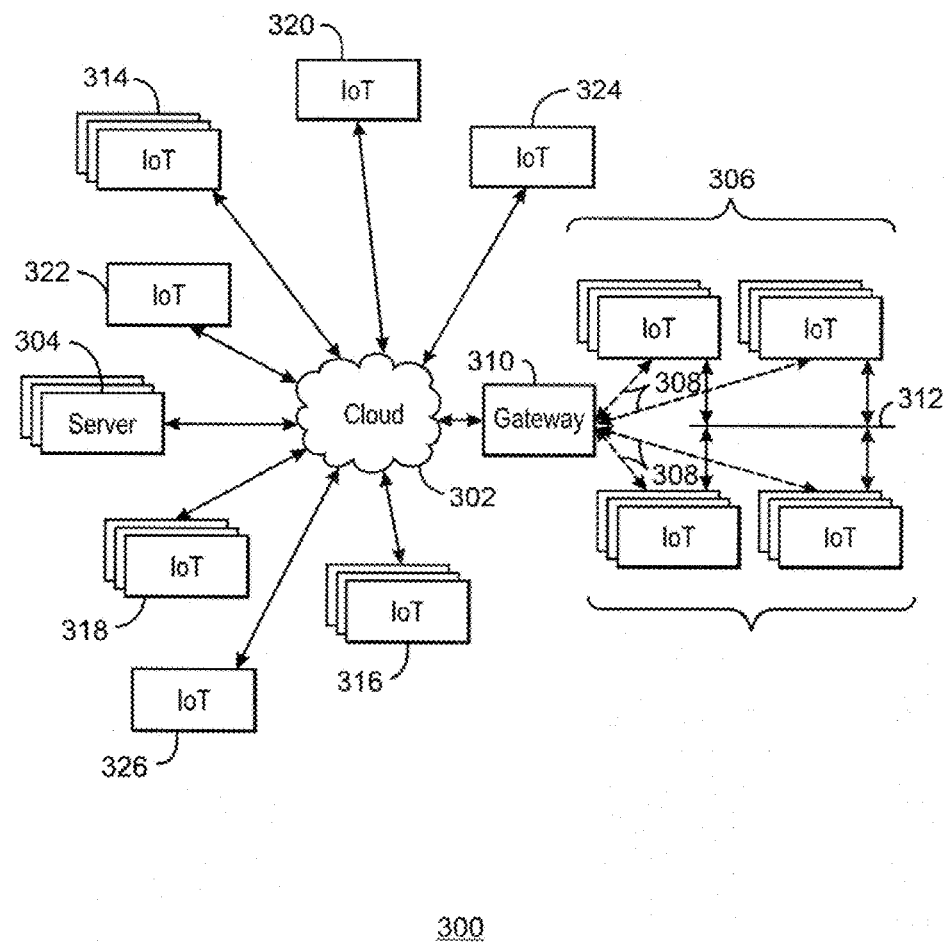
FIG. 8 illustrates a cloud computing network, or cloud, in communication with a number of Internet of Things (IoT) devices, in accordance with various embodiments of the present disclosure.

FIG. 8 is a drawing of a cloud computing network, or cloud 302, in communication with a number of Internet of Things (IoT) devices. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 8, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. This is discussed further with respect to FIG. 9.

Figure 9:
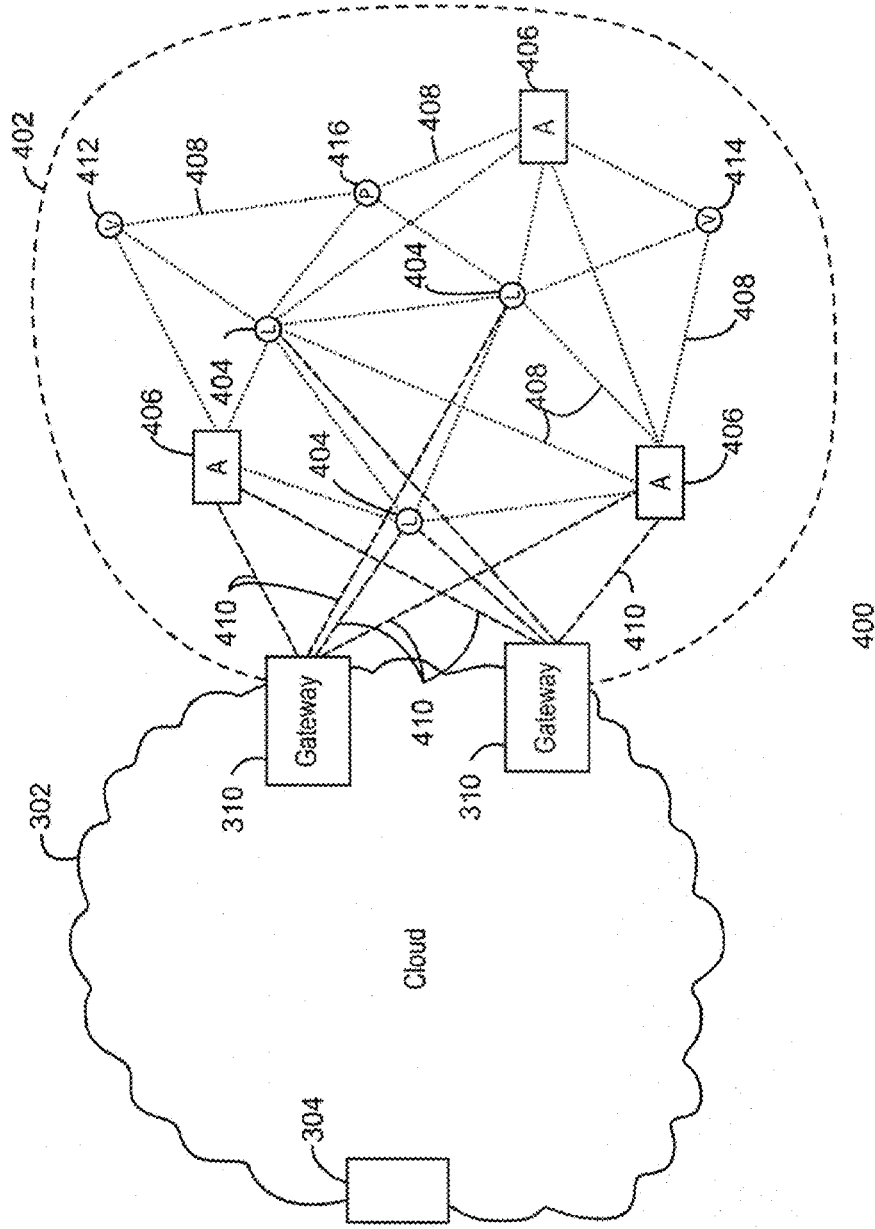
FIG. 9 illustrates a cloud computing network, or cloud, in communication with a mesh network of IoT devices, which may be termed a fog device, operating at the edge of the cloud, in accordance with various embodiments of the present disclosure.

FIG. 9 is a drawing 400 of a cloud computing network, or cloud 302, in communication with a mesh network of IoT devices, which may be termed a fog device 402, operating at the edge of the cloud 302. Like numbered items are as described with respect to FIG. 8. In this example, the fog device 402 is a group of IoT devices at an intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example.

Traffic flow through the intersection may be controlled by three traffic lights 404. Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communications link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

Communications from any IoT device may be passed along the most convenient path between any of the IoT devices to reach the gateways 310. In these networks, the number of interconnections provide substantial redundancy, allowing communications to be maintained, even with the loss of a number of IoT devices.

Not all of the IoT devices may be permanent members of the fog device 402. In the example in the drawing 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416.

The fog device 402 of the devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if an IoT device fails, other IoT devices may be able to discover and control a resource. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404.

As the transient devices 412, 414, and 416, leave the vicinity of the intersection the fog device 402, it may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs using resources from the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, module may refer to a software module, a hardware module, or any number or combination thereof.

As used herein, the term module includes logic that may be implemented in a hardware component or device, software or firmware that may be run or running on a processor, or a combination of processors. The modules may be distinct and independent components integrated by sharing or passing data, or the modules or monitors may be subcomponents of a single module or monitor, or be split among several modules or monitors. The components may be processes running on, or implemented on, a single compute node or distributed among a plurality of compute nodes running in parallel, concurrently, sequentially or a combination, as described more fully in conjunction with the flow diagrams in the figures.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

EXAMPLES

Example 1 may be a device, comprising: a persistent storage medium; a wireless transceiver to send and receive data; and a control module coupled with the persistent storage medium and the wireless transceiver, the control module to: establish a network connection, via the wireless transceiver, with an end device node in response to a solicitation received from the end device node; and store an identifier associated with the end device node in the persistent storage medium to enable the network connection to be reestablished with the end device node in the event that the network connection with the end device node is lost; wherein to enable the network connection to be reestablished with the end device node after the network connection is lost, the control module is further to: retrieve the identifier from the persistent storage medium in response to detection that the network connection with the end device node has been lost; and utilize the identifier to transmit an unsolicited message to the end device node.

Example 2 may include the subject matter of example 1, and the network connection is a secure network connection, and wherein to enable the secure network connection to be reestablished with the end device node after the network connection is lost, the control module is further to utilize the identifier to transmit a router-to-border router association message to a border router.

Example 3 may include the subject matter of any of examples 1-2, and the unsolicited message comprises an 802.15.4 protocol NA (neighbor advertisement), and the router-to-border router association message comprises an 802.15.4 protocol DAR (duplicate address request).

Example 4 may include the subject matter of any of examples 1-3, and the control module is further to detect that the network connection with the end device node has been lost.

Example 5 may include the subject matter of any of examples 1-4, and the control module is further to detect that the network connection with the end device node has been lost based at least in part on detection of a power failure or reset of the device.

Example 6 may include the subject matter of any of examples 1-5, and the device is a gateway device for establishment of a wireless personal area network (WPAN).

Example 7 may include the subject matter of any of examples 1-6, and the WPAN is a ZigBee network, a WiFi network, a Bluetooth network, a ZWave network, an internet protocol version 6 over low-power WPAN (6LoWPAN), an 802.15.4 network, a radio-frequency identification (RFID) network, or a cellular network.

Example 8 may include the subject matter of any of examples 1-7, and the end device node comprises an Internet of Things (IoT) device.

Example 9 may include the subject matter of any of examples 1-8, and the IoT device comprises a fog device.

Example 10 may include the subject matter of any of examples 1-9, and the device comprises a multiple device router.

Example 11 may be a method comprising: establishing, by a device, a network connection with an end device node, the establishing including transmitting a neighbor advertisement in response to receipt of a solicitation from the end device node; determining, by a device, that the network connection with the end device node has been lost; retrieving, by the device, an identifier of the end device node, from a persistent storage medium of the device, in response to detecting that the network connection with the end device node has been lost, wherein the identifier of the end device node was previously stored in the persistent storage medium in response to the establishment of the network connection with the end device node; and transmitting, by the device, a new neighbor advertisement to the end device node based at least in part on the retrieved identifier of the end device node without waiting for a new solicitation from the end device node.

Example 12 may include the subject matter of example 11, and determining that a network connection with the end device node has been lost is based at least in part on detecting, by the device, the occurrence of a power failure or reset of the device.

Example 13 may include the subject matter of any of examples 11-12, and the device is a gateway device for establishing of a wireless personal area network (WPAN).

Example 14 may include the subject matter of any of examples 11-13, and the WPAN is a ZigBee network, a WiFi network, a Bluetooth network, a ZWave network, an internet protocol version 6 over low-power WPAN (6LoWPAN), an 802.15.4 network, a radio-frequency identification (RFID) network, or a cellular network.

Example 15 may include the subject matter of any of examples 11-14, and the persistent storage medium is a trusted platform module and the network connection is a secure network connection.

Example 16 may by one or more computer-readable media having instructions stored thereon, wherein the instructions, in response to execution by a device, cause the device to: establish a network connection with router, the establishing including transmitting a solicitation to the router; ascertain whether or not to solicit a neighbor advertisement from the router in response to loss of the network connection with the router; and transmit a solicitation to the router only in response to an ascertainment to solicit the neighbor advertisement from the router.

Example 17 may include the subject matter of example 16, and the router is a gateway device for establishment of a wireless personal area network (WPAN).

Example 18 may include the subject matter of any of examples 16-17, and the WPAN is a ZigBee network, a WiFi network, a Bluetooth network, a ZWave network, an internet protocol version 6 over low-power WPAN (6LoWPAN), an 802.15.4 network, a radio-frequency identification (RFID) network, or a cellular network.

Example 19 may include the subject matter of any of examples 16-18, and the instructions, in response to execution by the device, further cause the device to detect that the network connection with the end device node has been lost.

Example 20 may include the subject matter of any of examples 16-19, and the instructions, in response to execution by the device, further cause the device to detect that the network connection with the end device node has been lost based at least in part on detection of a power failure or reset of the device.

Example 21 may include a device to reestablish a network connection, the device comprising: means for establishing a network connection with an end device node, the establishing including transmitting a neighbor advertisement in response to receipt of a solicitation from the end device node; means for determining that the network connection with the end device node has been lost; means for retrieving an identifier of the end device node, from a persistent storage medium of the device, in response to detecting that the network connection with the end device node has been lost, wherein the identifier of the end device node was previously stored in the persistent storage medium in response to the establishment of the network connection with the end device node; and means for transmitting a new neighbor advertisement to the end device node based at least in part on the retrieved identifier of the end device node without waiting for a new solicitation from the end device node.

Example 22 may include the subject matter of example 21, and the device is a gateway device for establishing of a wireless personal area network (WPAN).

Example 23 may include the subject matter of any of examples 21-22, and the WPAN is a ZigBee network, a WiFi network, a Bluetooth network, a ZWave network, an internet protocol version 6 over low-power WPAN (6LoWPAN), an 802.15.4 network, a radio-frequency identification (RFID) network, or a cellular network.

Example 24 may include the subject matter of any of examples 21-23, and the network connection is a secure network connection.

Example 25 may include the subject matter of any of examples 21-24, and the persistent storage medium is a trusted platform module and the network connection is a secure network connections.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. A device comprising:
   a persistent storage medium;
   a wireless transceiver to send and receive data; and
   a control module coupled with the persistent storage medium and the wireless transceiver, the control module to:
   establish a network connection, via the wireless transceiver, with an end device node in response to a solicitation received from the end device node; and
   store an identifier associated with the end device node in the persistent storage medium to enable the network connection to be reestablished with the end device node in the event that the network connection with the end device node is lost;
      wherein to enable the network connection to be reestablished with the end device node after the network connection is lost, the control module is further to:
   retrieve the identifier from the persistent storage medium in response to detection that the network connection with the end device node has been lost; and
   utilize the identifier to transmit an unsolicited message to the end device node.

2. The device of claim 1, wherein the network connection is a secure network connection, and wherein to enable the secure network connection to be reestablished with the end device node after the network connection is lost, the control module is further to utilize the identifier to transmit a router-to-border router association message to a border router.

3. The device of claim 2, wherein the unsolicited message comprises an 802.15.4 protocol NA (neighbor advertisement), and the router-to-border router association message comprises an 802.15.4 protocol DAR (duplicate address request).

4. The device of claim 1, wherein the control module is further to detect that the network connection with the end device node has been lost.

5. The device of claim 4, wherein the control module is further to detect that the network connection with the end device node has been lost based at least in part on detection of a power failure or reset of the device.

6. The device of claim 1, wherein the device is a gateway device for establishment of a wireless personal area network (WPAN).

7. The device of claim 6, wherein the WPAN is a ZigBee network, a WiFi network, a Bluetooth network, a ZWave network, an internet protocol version 6 over low-power WPAN (6LoWPAN), an 802.15.4 network, a radio-frequency identification (RFID) network, or a cellular network.

8. The device of claim 1, wherein the end device node comprises an Internet of Things (IoT) device.

9. The device of claim 8, wherein the IoT device comprises a fog device.

10. The device of claim 1, wherein the device comprises a multiple device router.

11. A method comprising:
    establishing, by a device, a network connection with an end device node, the establishing including transmitting a neighbor advertisement in response to receipt of a solicitation from the end device node;
    determining, by a device, that the network connection with the end device node has been lost;
    retrieving, by the device, an identifier of the end device node, from a persistent storage medium of the device, in response to detecting that the network connection with the end device node has been lost, wherein the identifier of the end device node was previously stored in the persistent storage medium in response to the establishment of the network connection with the end device node; and
    transmitting, by the device, a new neighbor advertisement to the end device node based at least in part on the retrieved identifier of the end device node without waiting for a new solicitation from the end device node.

12. The method of claim 11, wherein determining that a network connection with the end device node has been lost is based at least in part on detecting, by the device, an occurrence of a power failure or reset of the device.

13. The method of claim 11, wherein the device is a gateway device for establishing a wireless personal area network (WPAN).

14. The method of claim 13, wherein the WPAN is a ZigBee network, a WiFi network, a Bluetooth network, a ZWave network, an internet protocol version 6 over low-power WPAN (6LoWPAN), an 802.15.4 network, a radio-frequency identification (RFID) network, or a cellular network.

15. The method of claim 11, wherein the persistent storage medium is a trusted platform module and the network connection is a secure network connection.

16. One or more non-transitory computer-readable media having instructions stored thereon, wherein the instructions, in response to execution by a device, cause the device to:
    establish a network connection with a router, the establishing including transmitting a solicitation to the router;
    ascertain whether or not to solicit a neighbor advertisement from the router in response to loss of the network connection with the router; and
    transmit a solicitation to the router only in response to an ascertainment to solicit the neighbor advertisement from the router.

17. The non-transitory computer-readable media of claim 16, wherein the router is a gateway device for establishment of a wireless personal area network (WPAN).

18. The non-transitory computer-readable media of claim 16, wherein the WPAN is a ZigBee network, a WiFi network, a Bluetooth network, a ZWave network, an internet protocol version 6 over low-power WPAN (6LoWPAN), an 802.15.4 network, a radio-frequency identification (RFID) network, or a cellular network.

19. The non-transitory computer-readable media of claim 16, wherein the instructions, in response to execution by the device, further cause the device to detect that the network connection with the router has been lost.

20. The non-transitory computer-readable media of claim 19, wherein the instructions, in response to execution by the device, further cause the device to detect that the network connection with the router has been lost based at least in part on detection of a power failure or reset of the router.

21. A device to reestablish a network connection, the device comprising:

means for establishing a network connection with an end device node, the establishing including transmitting a neighbor advertisement in response to receipt of a solicitation from the end device node;

means for determining that the network connection with the end device node has been lost;

means for retrieving an identifier of the end device node, from a persistent storage medium of the device, in response to detecting that the network connection with the end device node has been lost, wherein the identifier of the end device node was previously stored in the persistent storage medium in response to the establishment of the network connection with the end device node; and means for transmitting a new neighbor advertisement to the end device node based at least in part on the retrieved identifier of the end device node without waiting for a new solicitation from the end device node.

22. The device of claim 21, wherein the device is a gateway device for establishing a wireless personal area network (WPAN).

23. The device of claim 22, wherein the WPAN is a ZigBee network, a WiFi network, a Bluetooth network, a ZWave network, an internet protocol version 6 over low-power WPAN (6LoWPAN), an 802.15.4 network, a radio-frequency identification (RFID) network, or a cellular network.

24. The device of claim 21, wherein the network connection is a secure network connection.

25. The device of claim 21, wherein the persistent storage medium is a trusted platform module and the network connection is a secure network connection.

* * * * *